United States Patent Office 2,871,226
Patented Jan. 27, 1959

2,871,226

ELASTOMERIC CONDENSATION PRODUCTS PREPARED FROM POLYETHER GLYCOLS

Herbert F. McShane, Jr., Wilmington, Del., assignor to E. I. du Pont de Nemours and Company, Wilmington, Del., a corporation of Delaware No Drawing. Application March 24, 1955
Serial No. 496,605

8 Claims. (Cl. 260—77.5)

This invention relates to an improved process for the preparation of elastomeric condensation products and more particularly to an improved process for the preparation of elastomeric condensation products with improved properties from the reaction between polyether glycols, an organic diisocyanate and a chain-extending agent.

In the manufacture of elastomeric condensation products by the reaction of polyalkyleneether glycols with a molar excess of an organic diisocyanate followed by chain extension with a compound having two active hydrogen atoms, urethane groups, —NHCO—O—, and urea groups, —NHCONH—, or equivalent are formed by reaction of the isocyanate groups with groups containing active hydrogen. The urethane groups are formed when an isocyanate group reacts with an alcoholic hydroxyl group, and the urea groups are formed when an isocyanate group reacts with water, amines or amides. The polymeric products formed are most frequently cured by mixing with a compound containing at least two isocyanate groups and then heating. Evidence leads to the belief that the hydrogen atom on a nitrogen in a urea group reacts quite readily with an isocyanate group while that on a nitrogen in a urethane group reacts with an isocyanate group only sluggishly, if at all, under the usual conditions of curing. Consequently, the relative positions of the urea groups in the molecule become quite important since they are believed to be the points of union between the polymer and the curing agent.

This invention has as an object to provide an improved process for the preparation of elastomeric condensation products with improved properties from the reaction between polyether glycols, an organic diisocyanate and a chain-extending compound. A further object is to provide an improved process for the preparation of elastomeric condensation products containing an ordered relationship between structural units so as to yield an elastomer with improved properties. Other objects will appear hereinafter.

These and other objects of the invention are accomplished by the improved process of preparing an elastomeric condensation product from a polyether glycol, an organic diisocyanate and a chain-extending compound which comprises reacting a polyether glycol, having a molecular weight of about 750 to 2,500, with an organic diisocyanate in a molar ratio of greater than 1:1 and not more than 2:1, the resulting polyurethane having a molecular weight of not greater than about 5,000 and being characterized by having terminal hydroxyl groups; adjusting the water content of the said polyurethane product to about 0.05 to 0.35 mol of water per mol of polyurethane product; reacting said polyurethane/water mixture with an organic diisocyanate, said diisocyanate being in excess over the theory required for reaction with said polyurethane/water mixture, the resulting polymer being characterized by having terminal isocyanate groups; and reacting said isocyanate-terminated polymer with a chain-extending agent having no more than two atoms bearing available active hydrogen atoms, the improvement comprising adding the organic diisocyanate to the polyurethane glycol/water mixture in two increments, the first of said increments being in excess over the theoretical amount required for reaction with said polyurethane/water mixture so as to produce a polymer characterized by having terminal isocyanate groups and the second of said increments being added after complete reaction of available active hydrogen in said polyurethane glycol/water mixture with said first increment.

The process of the present invention may be carried out in customary batch equipment or it may be carried out continuously. The formation of the polyether glycol polyurethane may be carried out in conventional chemical vessels, such as agitated kettles, since the viscosity of the resulting product is usually not too great for such handling. The reaction of the polyurethane glycol/water mixture with an excess over theory of organic diisocyanate yields a somewhat more viscous product which, at least in the lower molecular weight range, is still reasonably fluid. The chain extension step, however, produces a rubbery, high molecular weight material which must be handled in heavy-duty machinery such as Werner-Pfleiderer or Banbury type mixers or in specially designed equipment.

The term "polyether glycol" as used throughout the present specification and claims refers to polyethers which may be derived from alkylene oxides or glycols, or from heterocyclic ethers, such as dioxolane, and which may be represented by the formula: $HO(RO)_nH$, in which R stands for an alkylene radical such as methylene, ethylene, propylene, etc., and $n$ is an integer greater than 1. In the polyethers useful in the present invention, $n$ is sufficiently large so that the polyether glycol has a molecular weight of at least 750. It is to be understood that not all of the alkylene radicals present need be the same and that the alkylene radicals may be straight or branched chain. It is also to be understood that the term "polyether glycols" encompasses the use of polyalkyleneether-thioether glycols, as more particularly disclosed in co-pending application of Stilmar, Serial No. 423,215, filed April 14, 1954, and the polyalkylenearylene-ethers, as more particularly disclosed in co-pending application of Benning et al., Serial No. 485,288, filed January 31, 1955. For purposes of the present invention, the preferred polyether glycol is polytetramethyleneether glycol.

The molecular weight of the polyether glycol used should range from about 750 to about 2,500. Molecular weights below about 750 do not furnish a sufficiently large molecule with recurring ether groups to confer the improved properties on the elastomer due to their presence, while molecular weights of above 2,500 give polyurethanes having too great a distance between urea nitrogen locations to give cured elastomers with the more desirable properties. Molecular weights of about 800 to 1,200 are preferred.

Any of a wide variety of organic diisocyanates may be employed in the reaction, including aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i. e., those in which each of the two isocyanate groups is attached directly to an aromatic ring, are preferred. In general, they react more rapidly with the polyalkyleneether glycols than do the alkylene diisocyanates. Compounds such as 2,4-tolylene diisocyanate in which the two isocyanate groups differ in reactivity are particularly desirable. It is to be understood that the organic diisocyanate used to form the polyurethane glycol need not necessarily be the same as the organic diisocyanate which is reacted with the polyurethane glycol/water mixture in the process of the present invention.

The chain-extending agent which is used in the process of the present invention is a compound having no more than two atoms bearing available active hydrogen atoms. The term "active hydrogen atoms" refers to hydrogens which, because of their position in the molecule, display activity according to the Zerewitinoff test as described by Kohler in J. Am. Chem. Soc. 49, 3181 (1927). Since the process of the present invention is directed to the control of the space relations between the urethane nitrogens and the urea nitrogens, it is desirable to use only those chain extenders which yield at least one urea or amide nitrogen on reaction with an isocyanate group. Typical of the many compounds which are useful in this connection are water, carboxy acids, amines and amides, more particularly, adipic acid, terephthalic acid, adipamide, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, ethylenediamine, succinic acid, succinamide, 1,4-butanedisulfonamide, 2,4-tolylenediamine, bis(4-aminophenyl)methane, and 1,2-ethanedisulfonic acid. It is to be understood that when water, a carboxylic acid or a sulfonic acid is used as the chain extender, carbon dioxide is evolved during the reaction. This must be removed from the reaction product by mechanically working the polymer in a Werner-Pfleiderer mixer or on a rubber roll mill unless a porous product is desired.

In the formation of the elastomeric products by the process of the present invention, the polyether glycol is reacted with an organic diisocyanate in a molar ratio of greater than 1:1 and not more than 2:1. For purposes of the present invention, a molar ratio of polyether glycol to organic diisocyanate of 3:2 is preferred. The resulting product will be a polyurethane glycol with the general average structure

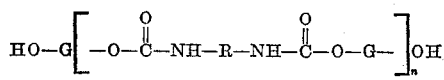

wherein R is the organic radical remaining when the two isocyanate groups are removed from an organic diisocyanate, G is the radical remaining when the two hydroxyl groups are removed from a polyether glycol, and $n$ is an integer, the value of which is set so as to yield a polyurethane glycol with a molecular weight of not greater than about 5,000. The water content of this polyurethane glycol is then adjusted to about 0.05 to 0.35 mol of water per mol of polyurethane glycol. In general, a polyurethane glycol contains about 0.05 mol of water due to the rigorous drying conditions which would be required to remove less than this quantity. For purposes of the present invention, it has been found that with greater than 0.35 mol of water present at this stage, excessive amounts of urea are introduced into the polymer, which tend to create products which, while elastomeric, are harder than desired. This polyurethane glycol/water mixture is then reacted with the first increment of organic diisocyanate, said increment being in excess over the amount theoretically required to react with the said mixture. The theoretical amount may be easily calculated since each hydroxyl group requires one isocyanate group to react and each water molecule requires two isocyanate groups for complete reaction. Since an excess over the theoretically required amount of organic diisocyanate is used, the resulting polyurethane is characterized by terminal isocyanate groups. The second increment of organic diisocyanate is then added and this is followed by the addition of a chain-extending agent, and a rubbery, high molecular weight material with improved properties is produced.

The process of the present invention results in elastomers with improved properties over the elastomers prepared by the process where the organic diisocyanate is added to the polyurethane glycol/water mixture all at once. This latter process is more particularly disclosed and claimed in co-pending U. S. application, Serial No. 496,607 of Walter, of even date herewith. In the process of the present invention, the first increment of diisocyanate which is added to the polyurethane glycol/water mixture is in excess over the theoretically required amount so as to yield an isocyanate-terminated polymer. After the hydroxyl number of the polyurethane glycol/water mixture disappears or when the isocyanate content by analysis becomes constant, the second increment of diisocyanate is added. This second increment remains without reacting until the chain-extending agent is added. At this time the second increment of diisocyanate reacts, resulting in a concentration of polyurea groups at the ends of the previously formed isocyanate-terminated polyurethane. By this procedure, an elastomer of markedly improved properties is produced over the elastomer produced when the same total proportion of organic diisocynate is added all in one step to the polyurethane glycol/water mixture. This feature of adding the organic diisocyanate in two separate portions permits varying the length of polyurethane chain which is to be ultimately chain extended.

It is to be understood that the process of the present invention is not limited to any particular reaction conditions since temperatures ranging from 50° to 150° C. and times of from about 20 minutes to 8 hours may be used. The polyurethane glycol may be prepared in from 1 to 3 hours at temperatures of about 90° to 120° C.; the isocyanate-terminated polymer may be prepared in from 1 to 5 hours at temperatures of from about 60° to 90° C. and the chain-extension step may be carried out at 55° to 120° C. in from about 20 minutes to 3 hours.

After the chain-extension step in the process of the present invention, it is desirable to stabilize the resulting elastomeric condensation product in order to avoid premature curing. This stabilization may be brought about by using a nitrogen containing compound such as piperidine, ammonia, etc. This stabilized polymer may then be stored for a period of several months until it is to be used, at which time it can be converted to the final elastomeric product by incorporating therewith an organic compound containing at least two isocyanate groups.

The following examples will better illustrate the nature of the present invention; however, the invention is not intended to be limited to these examples. Parts are by weight unless otherwise indicated.

EXAMPLE 1

Preparation of control elastomer wherein organic diisocyanate is added to polyurethane glycol/water mixture all at once.

A mixture of 1,200 g. of polytetramethylene ether glycol of average molecular weight 947 and 150 g. of 2,4-tolylene diisocyanate are heated for 3 hours at 100° C. to form a polyurethane glycol. 1,309 grams of this polyurethane glycol and 0.38 g. of water are stirred together at 70° C. for 15 minutes under an atmosphere of nitrogen and then 116.3 g. of 2,4-tolylene diisocyanate is added. Stirring under an atmosphere of nitrogen is continued for 3 hours at 70° C. This isocyanate-terminated polymer is placed in a one-gallon Werner-Pfleiderer mixer which is equipped with dispersion type blades, and 60 g. of water is added. A nitrogen atmosphere is maintained in the mixer. Mixing is carried on for 30 minutes at 8 R. P. M., the temperature being held at 70° C. The agitation is stopped and the mass allowed to stand for 2 hours. The rubbery polymer is then removed from the mixer, transferred to a rubber roll mill, and 1 g. of piperidine is milled in to stabilize it.

EXAMPLES 2–4

The following examples were carried out by the process of Example 1, except that the organic diisocyanate was added to the polyurethane glycol/water mixture in two separate increments.

*First Step*

| Ex. No. | Polytetramethylene Ether Glycol | | 2,4-Tolylene Diisocyanate, Wt. Gr. |
|---|---|---|---|
| | Mol. Wt. | Wt. Gr. | |
| 2 | 947 | 1,200 | 150 |
| 3 | 947 | 1,200 | 150 |
| 4 | 947 | 1,200 | 150 |

*Second Step*

| Ex. No. | Polyurethane Glycol | Water, Wt. Gr. | 2,4-Tolylene Diisocyanate, Wt. Gr. | |
|---|---|---|---|---|
| | | | 1st | 2nd |
| 2 | 1,312 | 0.38 | a 86 | b 36 |
| 3 | 1,310 | 0.38 | 107 | 14 |
| 4 | 1,309 | 0.38 | 107 | 13 |

*Third Step*

| Ex. No. | Water, Wt. Gr. |
|---|---|
| 2 | c 50 |
| 3 | d 50 |
| 4 | e 50 | a Heating carried out for 5 hours.
b Stirred 15 minutes to mix in thoroughly.
c The Werner-Pfleiderer mixer is run for 15 minutes at 60° C., then intermittently for 10 seconds every 2 minutes for 30 minutes and then 10 seconds every 5 minutes for 37 minutes.
d Same as (c) except last period is 45 min.
e Same as (d) plus 30 minutes standing.

The stabilized polymers of Examples 1 to 4 are compared by the Williams plasticity measurement. The test has A. S. T. M. designation D926–47T and is also described by Williams in Industrial and Engineering Chemistry 16, 362 (1924). The temperature of the test is 120° C. and the time for the plasticity measurement is 3 minutes and for the recovery measurement is 1 minute.

The results of the test are as follows:

| Example | Williams | |
|---|---|---|
| | Plasticity | Recovery |
| (1) Control | (62) | (1) |
| 2 | 179 | 101 |
| 3 | 131 | 40 |
| 4 | 117 | 37 |

It is readily apparent that the amount of 2,4-tolylene diisocyanate added in the first increment has a considerable influence on the character of the polymer.

The Mooney scorch test ("A. S. T. M. Standards on Rubber Products," May 1951—A. S. T. M. method D–1077–49–T) measures the change in viscosity of a curable mixture as a function time at a specific temperature. This test is applied to the polymers of Examples 2 and 3, using the small rotor at 250° C. 100 parts of each sample is milled with 3 parts of N,N′-bis(3-isocyanato-4-methylphenyl)urea for use in the test. They show 10 point rises from the minimum in 45 and 35 minutes respectively, compared to 19 minutes for Example 1 used as a control, thus illustrating a considerable improvement in processing safety.

It is quite apparent from the preceding examples that the elastomers prepared according to the process of the present invention exhibit a distinct improvement over the elastomers prepared by the process of adding the same overall amount of organic diisocyanate, but adding it all in one step.

The elastomers prepared according to the process of the present invention may be employed in the preparation of tires, inner tubes, belts, hose and tubing, wire and cable jackets, footwear, sponges, coated fabrics and a wide variety of coated or molded articles.

The elastomeric properties of the products produced by the process of the present invention may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide and plasticizers. Inorganic and organic coloring agents may be incorporated to give well defined colors.

As many widely different embodiments of this invention may be made without departing from the spirit and scope thereof, it is to be understood that this invention is not limited to the specific embodiments thereof except as defined in the appended claims.

What is claimed is:

1. In the process for the preparation of curable elastomeric condensation products comprising reacting a polyether glycol having a molecular weight of about 750 to 2,500 with an organic diisocyanate in which the isocyanate groups are the sole reactive functional groups thereof in a molar ratio of greater than 1:1 and not more than 2:1, the resulting polyurethane having a molecular weight of not greater than 5,000 and being characterized by having terminal hydroxyl groups; adjusting the water content of the said polyurethane product to about 0.05 to 0.35 mol of water per mol of polyurethane product; reacting said polyurethane glycol/water mixture with an organic diisocyanate in which the isocyanate groups are the sole reactive functional groups thereof, in a molar ratio of diisocyanate to polyurethane glycol/water mixture of about 1.6:1, so as to produce an isocyanate-terminated polymer; and reacting said isocyanate-terminated polymer with a chain-extending agent having no more than two atoms bearing available active hydrogen said chain-extending agent being selected from the group consisting of water and organic compounds containing two active hydrogen containing groups in the molecule, said active hydrogen containing groups being reactable with isocyanate groups; the improvement comprising adding the said organic diisocyanate to said polyurethane glycol/water mixture in two separate increments, the first of said increments being added in a molar ratio of diisocyanate to polyurethane glycol/water mixture of about 1.1:1 to 1.5:1 so as to produce a polymer characterized by having terminal isocyanate groups and the second of said increments being added after complete reaction of available active hydrogen in said polyurethane glycol/water mixture with said first increment.

2. A process according to claim 1 in which the polyether glycol is a polytetramethylene ether glycol.

3. A process according to claim 1 in which the organic diisocyanate which is reacted with the polyether glycol is 2,4-tolylene diisocyanate.

4. A process according to claim 1 in which the organic diisocyanate which is reacted with the polyurethane glycol/water mixture in two separate increments is 2,4-tolylene diisocyanate.

5. A process according to claim 1 in which the chain-extending agent is water.

6. In the process for the preparation of curable elastomeric condensation products comprising reacting a polytetramethylene ether glycol having a molecular weight of about 800 to 1,200 with 2,4-tolylene diisocyanate in a molar ratio of 3:2, the resulting polyurethane having a molecular weight of not greater than 5,000 and being characterized by having terminal hydroxyl groups; adjusting the water content of the said polyurethane product to about 0.05 to 0.35 mol of water per mol of polyurethane product; reacting said polyurethane glycol/water mixture with 2,4-tolylene diisocyanate in a molar ratio of diisocyanate to polyurethane glycol/water mixture of about 1.6:1 so as to produce an isocyanate-terminated polymer; and reacting said isocyanate-terminated polymer with water; the improvement comprising adding the 2,4-tolylene diisocyanate to said polyurethane glycol/water mixture in two separate increments, the first of said increments being added in a molar ratio of diisocyanate to polyurethane glycol/water mixture of about 1.1:1 to 1.5:1 so as to produce a polymer characterized by having terminal isocyanate groups and the second of said increments being added after complete reaction of available active hydrogen in said polyurethane glycol/water mixture with said first increment.

7. The products produced according to the process of claim 1.

8. The products produced according to the process of claim 6.

References Cited in the file of this patent
UNITED STATES PATENTS

| | | |
|---|---|---|
| 2,621,166 | Schmidt et al. | Dec. 9, 1952 |
| 2,692,874 | Langerak | Oct. 26, 1954 |
| 2,702,797 | Rugg | Feb. 22, 1955 |
| 2,723,935 | Rodman | Nov. 15, 1955 |